United States Patent
Dean et al.

(10) Patent No.: US 8,929,419 B1
(45) Date of Patent: Jan. 6, 2015

(54) EXCIMER LASER WITH GAS PURIFICATION

(71) Applicant: LightMachinery Inc., Nepean (CA)

(72) Inventors: Jesse Dean, Ottawa (CA); Ian J. Miller, Ottawa (CA); Edward S. Williams, Kanata (CA); John H. Hunter, Almonte (CA)

(73) Assignee: LightMachinery Inc., Ottawa (CA)

( * ) Notice: Subject to any disclaimer, the term of this patent is extended or adjusted under 35 U.S.C. 154(b) by 0 days.

(21) Appl. No.: 13/965,551

(22) Filed: Aug. 13, 2013

(51) Int. Cl.
 *H01S 3/22* (2006.01)
 *H01S 3/225* (2006.01)
 *H01S 3/036* (2006.01)

(52) U.S. Cl.
 CPC .................................... *H01S 3/036* (2013.01)
 USPC ............................................. 372/57; 372/59

(58) Field of Classification Search
 USPC .................................................... 372/57, 59
 See application file for complete search history.

(56) References Cited

U.S. PATENT DOCUMENTS

| 4,629,611 | A | * | 12/1986 | Fan | 423/240 R |
| 4,674,099 | A | * | 6/1987 | Turner | 372/59 |
| 6,215,806 | B1 | | 4/2001 | Ohmi et al. | 372/57 |
| 6,735,233 | B2 | | 5/2004 | Osmanow et al. | 372/59 |
| 2010/0232469 | A1 | * | 9/2010 | Levatter et al. | 372/57 |

OTHER PUBLICATIONS

Saito et al, "Long Lifetime Operation of an ArF-Excimer Laser" in the Applied Physics B 62 (Laser and Optics) 1996, pp. 229-235.

* cited by examiner

*Primary Examiner* — Julio J Maldonado
*Assistant Examiner* — Michael Carter
(74) *Attorney, Agent, or Firm* — Teitelbaum & MacLean; Neil Teitelbaum; Doug MacLean

(57) ABSTRACT

An excimer laser system in which the expensive noble gases are reclaimed, while the halogen gas is sacrificed, and the impurities developed during operation of the excimer laser are removed. In the approach disclosed a multi-stage gas purifier is used with a single, premix gas bottle containing a halogen-rich laser gas mixture comprising noble, buffer and halogen gas, to maintain the optimum halogen content of the laser, while also maintaining a consistent ratio of noble, buffer and halogen gases without complicated control apparatus.

18 Claims, 7 Drawing Sheets

EXCIMER LASER WITH GAS PURIFICATION

TECHNICAL FIELD

The present invention relates to an excimer laser, and in particular to an excimer laser with a purifying system, which greatly reduces operating costs.

BACKGROUND OF THE INVENTION

Gas discharge excimer lasers require three or more part, mixtures of high purity gases to operate efficiently. Operation of excimer lasers is expensive, because they require a gas mixture composed of two or more costly, high-purity noble gases, e.g. Ne, Ar, Xe, Kr, and a highly reactive halogen gas, e.g. F, Cl. During operation of the excimer laser, the halogen gas component reacts with materials inside the laser, e.g. C, H, and is depleted from the gas mixture requiring periodic replacement. Halogen depletion coincides with the formation of impurities within the laser chamber, which impairs laser operation reducing the laser output power. The impurities reduce laser output through a combination of UV light absorption, scattering and discharge kinetics degradation. The output of the laser can be degraded by 50% when concentrations of impurities as low as 0.1% (1000 ppm) of the gas mixture are reached.

In order to maintain a constant power from the laser, the voltage applied to the laser's electrodes can be increased to overcome the reduction in output power caused by the contaminants and the depleted halogen. Unfortunately, the higher voltages lead to a more rapid deterioration of the electrode materials in the laser, and a large increase in maintenance costs. A portion of the laser output energy can be recovered by simply replacing the depleted halogen in the laser chamber; however, without a means to remove the impurities, the laser gas mixture must be eventually replaced to return the laser back to full output.

Accordingly, a significant portion of the operating cost of an excimer laser is therefore related to the contamination of costly, high purity, noble gases, e.g. argon, krypton, xenon and neon.

A conventional solution to extend gas lifetime or recover the expensive noble gas is disclosed in U.S. Pat. No. 6,735,233 issued May 11, 2004 to Osmanous et al, illustrated in FIG. 1, in which the use of a heated refractory metal, e.g. zirconium, filament for removal of impurities, such as $H_2O$, $N_2$ and $O_2$, to extend the life of a gas discharge laser.

With reference to FIG. 2, Saito et al, discloses, in a paper entitled "Long Lifetime Operation of an ArF-Excimer Laser" in the Applied Physics B 62 (Laser and Optics) 1996, Pages 229-235, a dual purifier unit in which a liquid nitrogen-cooled condenser is in parallel with a halogen ($F_2$) gas remover for performing separate filtration processes.

FIG. 3 illustrates a purification system disclosed in U.S. Pat. No. 4,629,611 issued Dec. 16, 1986 to Fan, in which a multi-stage filtration process is followed by a complicated gas replenishment system involving at least three separate source bottles and an equal number of flow controllers.

U.S. Pat. No. 6,215,806 issued Apr. 10, 2001 to Ohmi et al, illustrated in FIG. 4, discloses the use of premix gas supply bottles, but unfortunately, a plurality of supply bottles is still required along with a complicated valve and pressure control systems. Moreover, a single premix bottle cannot be used for both initial fill up and continuous replenishment of laser gases.

An object of the present invention is to overcome the shortcomings of the prior art by providing an apparatus and method, which incorporates a unique change to the design concept of an excimer laser, whereby the expensive noble gases are reclaimed, the halogen gas is sacrificed, and the impurities developed during operation of the excimer laser are removed. In the approach disclosed, a multi-stage gas purifier is used with a single, premix halogen-rich gas bottle containing noble, buffer and halogen gas, to maintain the optimum halogen content of the laser while also maintaining a consistent ratio of noble, buffer and halogen gases in the laser chamber.

SUMMARY OF THE INVENTION

Accordingly, the present invention relates to an excimer laser system comprising:

a laser chamber containing a laser gas mixture of a noble gas, a buffer gas and a halogen gas at operating concentrations for operating the laser, the laser chamber including a gas input port and a gas output port;

a scrubber coupled to the gas output port for removal of the halogen gas;

a gas purifier coupled between the scrubber and the gas input port for removing impurities from the noble and buffer gases;

a pump for circulating the laser gas mixture out of the gas output port, and the noble and buffer gases back in the input port after purification;

a gas supply bottle coupled to the laser chamber containing a halogen-rich laser gas mixture including the noble lasing gas and buffer gas at a ratio the same as the operating concentrations, and the halogen gas at above the operating concentration; and a controller for isolating the gas purifier from the laser chamber, for coupling the gas supply bottle directly to the laser chamber, and for supplying the halogen-rich laser gas mixture to replenish the halogen gas without affecting the relative concentration of noble and buffer gases.

Another aspect of the present invention relates to a method of operating an excimer laser comprising:

a) providing a laser chamber containing a laser gas mixture comprising a noble gas, a buffer gas and a halogen gas at operating concentrations, the laser chamber;

b) providing a gas supply bottle containing a halogen-rich laser gas mixture comprising the noble and buffer lasing gases at a ratio of approximately the same as in the operating concentration, and the halogen gas at above the operating concentration;

c) passing the laser gas mixture through a scrubber to remove the halogen gas, and through a purifier to remove impurities from the noble and buffer gases;

d) isolating the scrubber and purifier from the laser chamber for coupling the gas supply bottle directly to the laser chamber, and e) supplying the noble and buffer gases only from the supply bottle at the ratio approximately the same as in the operating concentrations, and the halogen gas at above the operating concentration to replenish the halogen gas without affecting the concentration of noble and buffer gases.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
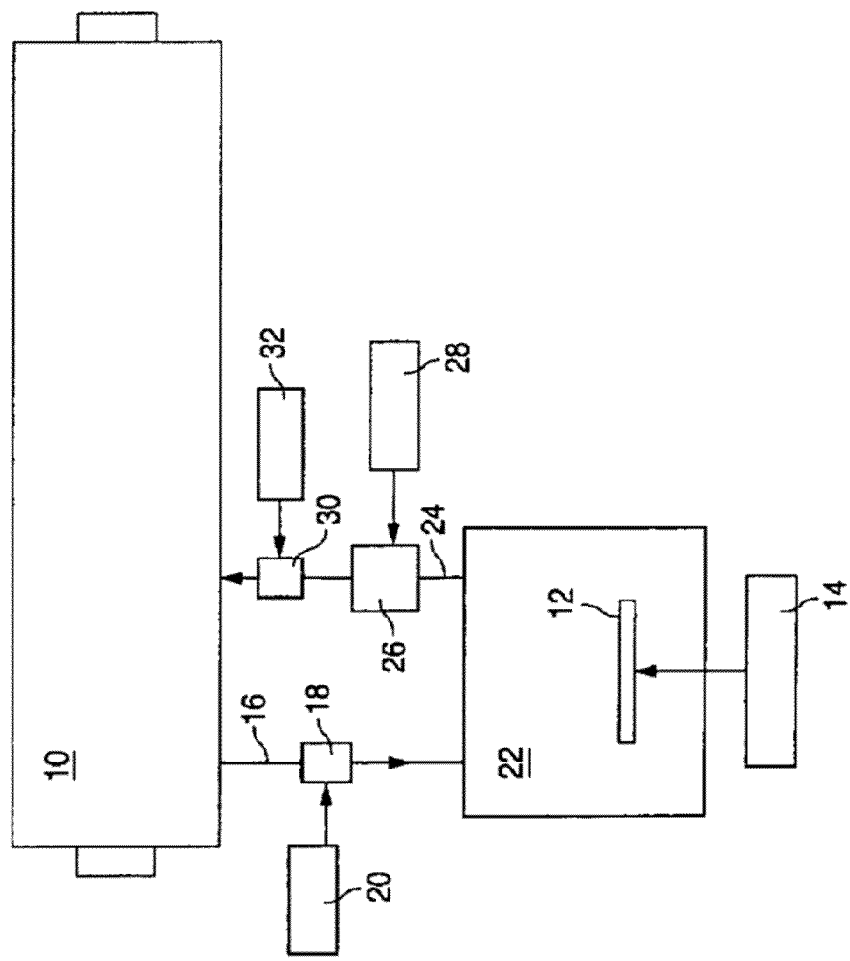
FIG. 1 illustrates a conventional excimer laser with a single stage purifier.
Figure 2:
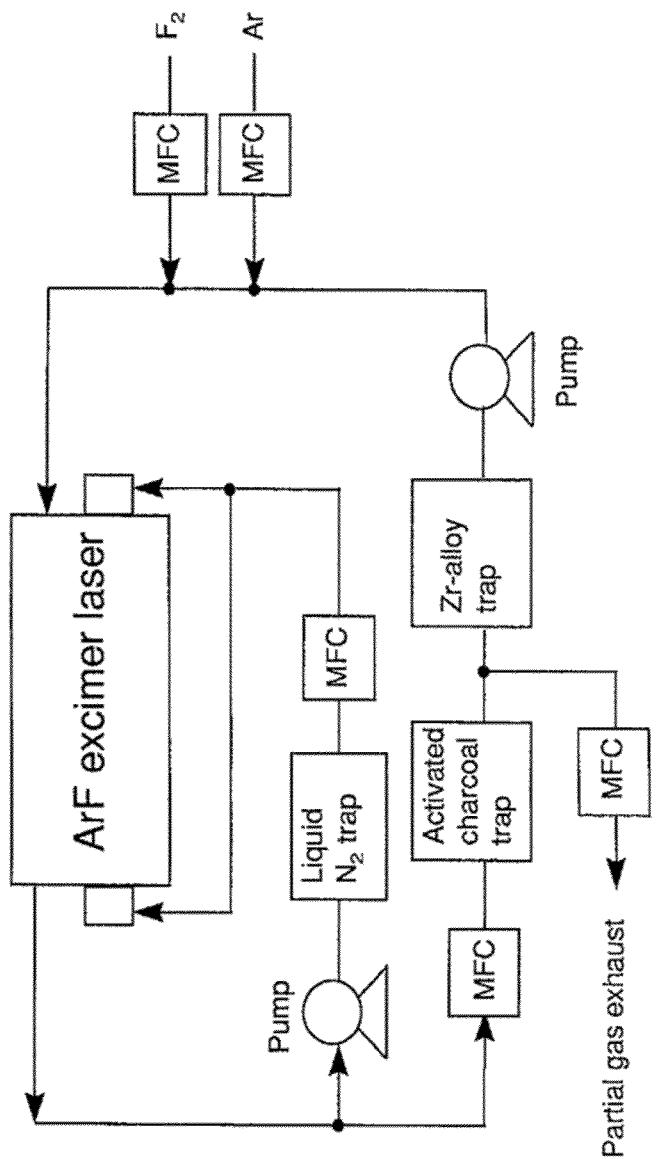
FIG. 2 illustrates a conventional excimer laser with a parallel path purifier.
Figure 3:
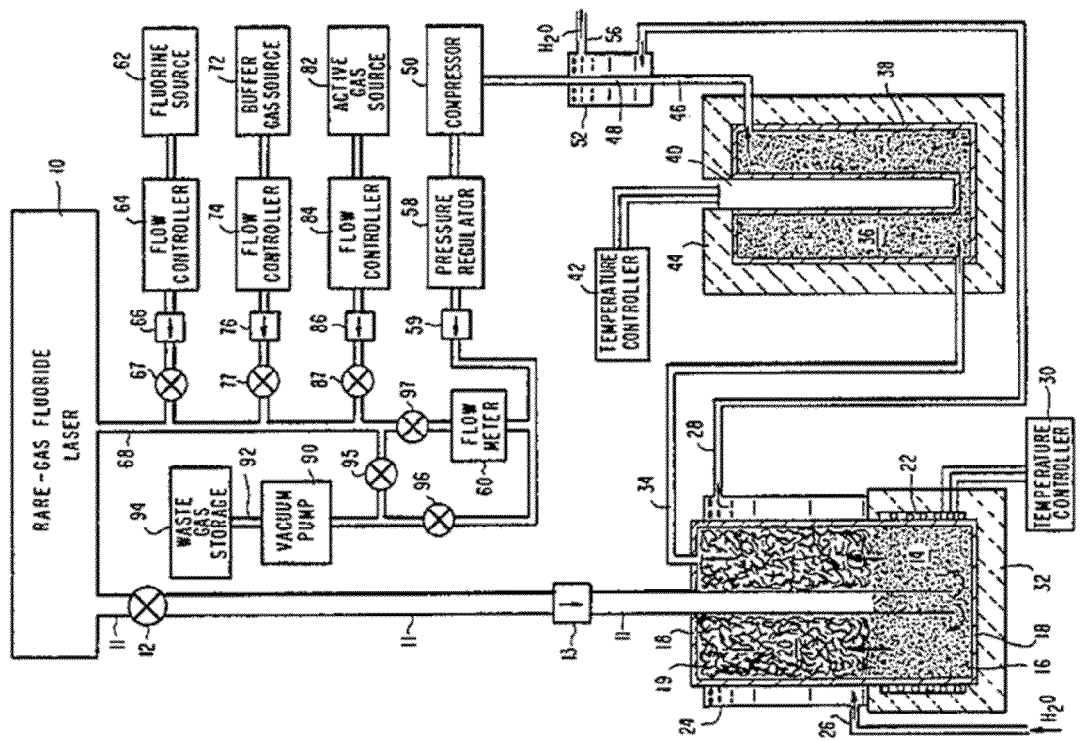
FIG. 3 illustrates a conventional excimer laser with a plurality of refill containers.
Figure 4:
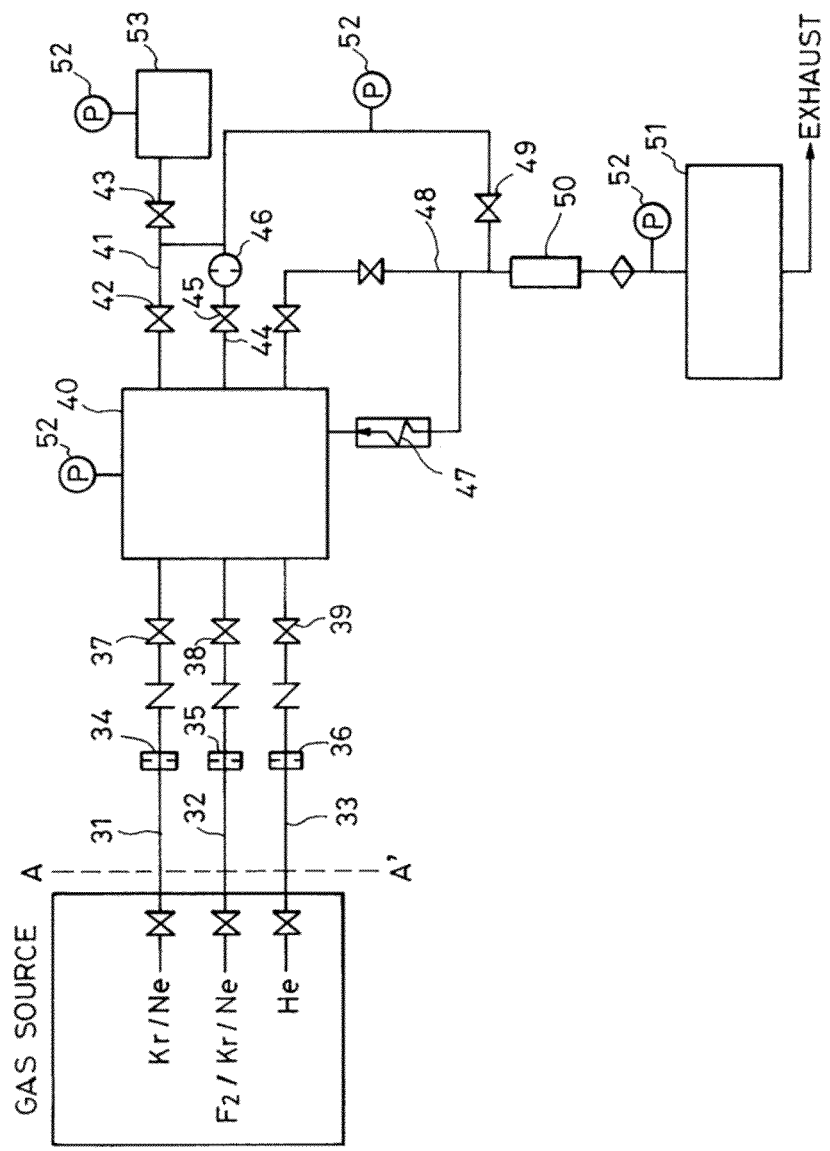
FIG. 4 illustrates a conventional excimer laser with a plurality of refill containers.
Figure 5:
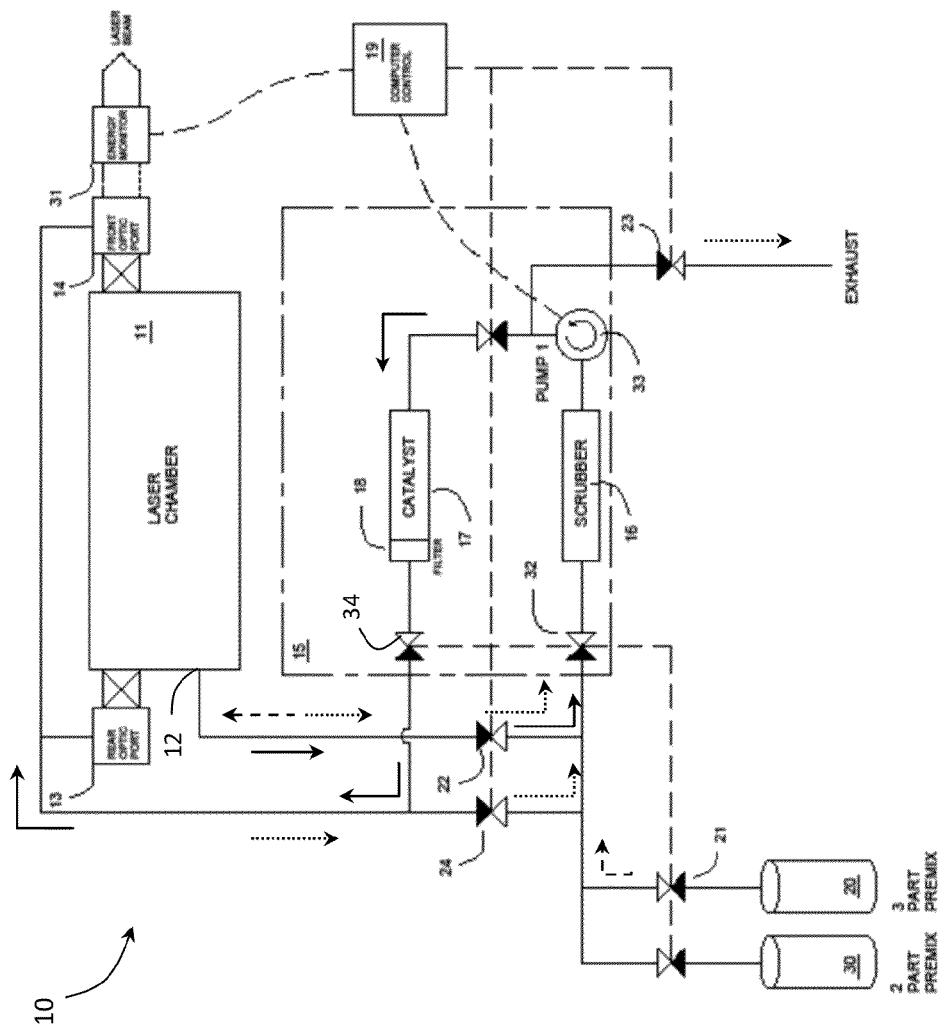
FIG. 5 illustrates an excimer laser in accordance with the present invention.

With reference to FIG. 5, the purification method and apparatus according to a preferred embodiment of the present invention are specifically for noble gas recovery, e.g. argon, krypton, xenon and neon, while sacrificing halogen gas, based on excimer laser installation 10. The halogen gas and noble lasing gas preferably comprise one of; Ar:F, Kr:F, Xe:F, Ar:Cl, Kr:Cl, and Xe:Cl, respectively. During purification, spent laser gases containing impurities at the 10 s to 100 s of ppm level are circulated from a laser chamber 11 via input/output port 12 using a pump 33 through a gas purifier 15, with several stages of gas purification, and back to the chamber 11 through the optic ports 13 and 14 or other input ports provided (see solid arrows in FIG. 5).

The first stage of purification, after input valve 32 and prior to the recirculation pump 33, is a scrubber 16 that reacts with the halogen component, e.g. fluorine (F), chlorine (Cl), bromine (Br), or iodine (I), to remove it from the laser gases. As an example, the scrubber 16 may comprise a salt (alkali metal and halide compound) or a caustic soda. Reactions between the salt and the halogen component of the gas mixture have the advantage that they do not produce oxygen as a by-product of their reaction, unlike caustic soda, and extend the life of the purifier 15. In the second stage of the scrubber molecular sieve materials are used to remove particulates and trace gases. After the pump 33, (e.g. a positive displacement, diaphragm pump) the remaining gases are passed through a commercially available catalytic processor 17, e.g. either at room temperature or heated to a temperature between 400° C. and 700° C. The catalyst 17 dissociates stable contaminants of the laser gas, such as $CF_4$, HF, and $H_2O$. The dissociated components of the contaminants, especially $F_2$ and oxygen, are then adsorbed in a getter material or molecular sieve. In some instances hydrogen is freed during dissociation of these contaminants and not adsorbed by the getter. Ideally, a final stage is included in which a low temperature getter and a particle filter 18, capable of filtering submicron particles, removes solid particles created in the high temperature catalyst stage and removes hydrogen from the gas stream.

Exiting the gas purifier 15, via output valve 34, impurities are reduced from about 100 to 500 ppm to about 1 to 500 ppb levels, the halogen gas has been removed and the noble gases in their original concentrations are returned to the laser chamber 11 via optic ports 13 and 14 or another suitable return port. The proposed invention takes advantage of the halogen scrubbing properties of the gas purifier 15 to simplify gas handling, while managing the two functions of filling the laser chamber 11 with the proper lasing gas concentrations during start up and purification, and replenishing depleted halogen during running of the laser 10.

In FIG. 5, a halogen-rich premix gas cylinder 20 is attached to the laser gas manifold 21. The gas cylinder 20 contains a halogen-rich laser gas mixture comprising the rare, and one or more buffer gases in the correct ratio of the final concentrations required for optimum laser output, as well as halogen gas. The halogen gas concentration in the bottle 20 is between 3 and 100, preferably 5 and 100, and more preferably between 10 and 50, times the mole % required for optimum output.

When initially filling the laser gases in the laser chamber 11, the laser chamber 11 is first evacuated using the gas recirculation pump 33 either via input/output port 12 and the valves 22 and 32 or via optic ports 13 and 14 and valves 24 and 32 through the scrubber 16 and exhaust valve 23 to the exhaust line (see dotted arrows in FIG. 5). The pump 33 is used to reduce the pressure in the laser chamber 11 to approximately 100 mBar ($1/10^{th}$ atmosphere or $1/50^{th}$ of the fill pressure). The laser chamber 11 is then filled to near the final fill pressure (for example 3000 to 5000 mBar) using a supply of the laser gas mixture from two-part or three-part premix gas cylinder 30. The supply can be a two-part premix containing only the noble and buffer gases in the correct ratio, which can then be supplemented with halogen from the halogen-rich premix gas cylinder 20, or a three-part premix containing the noble, buffer and halogen gases in the proper ratio. Alternatively, and preferably, the initial filling can be executed using the halogen-rich laser gas mixture from gas cylinder 20 exclusively, as hereinafter described, eliminating the need for any other supply cylinders.

Once the laser chamber 11 is filled with the halogen-rich laser gas mixture from gas cylinder 20, and before operation of the laser 10 begins, the gas cylinder 20 is shut off, e.g. via valve 21, and the pump 33 is used to circulate the halogen-rich laser gas mixture from the laser chamber 11 through the gas purifier 15, out the input/output port 12 and back in the optic ports 13 and 14 (solid arrows) removing any impurities found in the gas cylinder 20. As a result, lower grade gas containing trace impurities can be used, reducing the costs of operation of the laser 10. The initial purification process also removes the halogen gas present in the gas mixture reducing the pressure inside the laser chamber 11. Subsequently, the gas purifier 15 is shut-off, e.g. using valve 32, and the halogen-depleted laser-gas mixture in the laser chamber 11 is supplemented with halogen-rich premix-gas directly from the gas cylinder 20 into input/output port 12 (dashed arrows) to bring the amount of halogen up to the required level, while maintaining the noble and buffer gases at the correct ratio. The entire process can be done manually or preferably automatically under the control of a control processor 19 e.g. hardware and suitable software stored on non-transitory memory.

During normal operation of the laser chamber 11, halogen gas is depleted. An energy monitor 31 and the control processor 19 monitor one or more operating conditions e.g. output power, output energy, halogen content, of the laser 10, and adjust the input of halogen gas, i.e. halogen rich laser gas mixture, from gas cylinder 20 to ensure each monitored operating condition stays within a predetermined range or above a predetermined operating level. Thermopile or photodiode sensors can be used to measure optical power and/or energy of the laser 10. The halogen gas concentration can be measured by any conventional meter particular to the specific halogen gas. As the operating condition of the laser 10 returns to nominal operating conditions, e.g. above a threshold level or within desired range, the control processor 19 halts the input of halogen gas.

Ideally, the energy monitor 31 and the control processor 19 monitor the operating conditions e.g. output power or energy, of the laser 10, and adjust the electrical energy, e.g. voltage, into the laser chamber 11, via input electrodes, to maintain a constant laser output power or energy level, i.e. as the halogen is depleted, the voltage input to the laser chamber 11 increases, to maintain a constant laser power or energy output. In response to the energy monitor 31 detecting the operating condition outside the desired operating range, e.g. an increase in voltage input to the laser 10 above a predetermined input voltage level, the control processor 19 injects halogen, i.e. the halogen-rich premix along with the noble and buffer gases, from the gas cylinder 20 either via valves 21 and 22 into input/output port 12 or via valves 21 and 24 into optic ports 13 and 14 or via an alternative input port, to replace the depleted halogen gas. As the halogen concentration is returned to its nominal value, the monitored operating condition returns to within the desired operating range, e.g. the laser power/energy output increases, the control processor 19 decreases the electrical energy into the discharge to maintain the target laser output power/energy relatively constant, and reduces or shuts off the injection of the halogen-rich gas mixture into the laser chamber 11. By enabling the control processor 19 to temporarily adjust the input voltage to maintain the output power/energy of the laser 10, the frequency of halogen injections from the gas cylinder 20 and purifier shut-downs is reduced.

After an injection of halogen-rich gas, the control processor 19 may correct for the resulting gas pressure increase in the laser chamber 11 by pumping out a small portion of the laser gas mixture, via exhaust valve 23, returning in the laser chamber 11 to the correct operating pressure. With increasing halogen concentrations, less of the noble gases in the fill bottle 20 are pumped away during pressure corrections, i.e. pressure corrections are smaller or less frequent, and less of the noble gases in the laser chamber 11 are pumped away during pressure corrections.

The purification process can be run: 1) continuously during operation of the laser 10, 2) at set times and duration during operation or shut-down under control of the control processor 19, 3) at random times and duration during operation and shut-down based on the operator's desire, or 4) initiated by the control processor 19 based on the operating conditions of the laser 10, e.g. power output or voltage input.

Continuous Gas Purification:

During normal operation of the laser 10, the laser gas mixture can be reconstituted continuously using the gas purification unit 15. The energy monitor circuit 31 and the control processor 19 monitor the operating condition, e.g. output power of the laser 10, and adjust the electrical energy, i.e. voltage, or inject halogen gas from gas cylinder 20 into the laser chamber 11 to maintain a constant laser output power level. Using the gas circulation pump 33, gases present in the laser chamber 11 are circulated through the input/output port 12 via head valve 22 and purifier input valve 32 (see solid arrows in FIG. 5) at a slow rate through the gas scrubber 16 to remove reactive gases present, including the halogen gas required for operation of the laser 10. Slow flow rate is suitable for continuous operation of the gas purification unit 15, the minimum flow rate is determined by the impurity generation rate and the maximum is limited by the rate of usage of the halogen gas, e.g. fluorine, e.g. between about 0.1 and 0.5 l/min (standard l/min or slpm). Inert contaminants and the noble gases required for laser operation are then passed by the pump 33 through a catalyst 17, e.g. either at room temperature or heated to a temperature between 400° C. and 700° C., so that the contaminants are dissociated into simpler constituent atoms or molecules, which can be adsorbed or reacted out of the gas stream. Solid particulates exiting the catalyst 17 are then captured by a filter 18 prior to return to the laser chamber 11 via optic ports 13 and 14 or another suitable return port.

Figure 6:
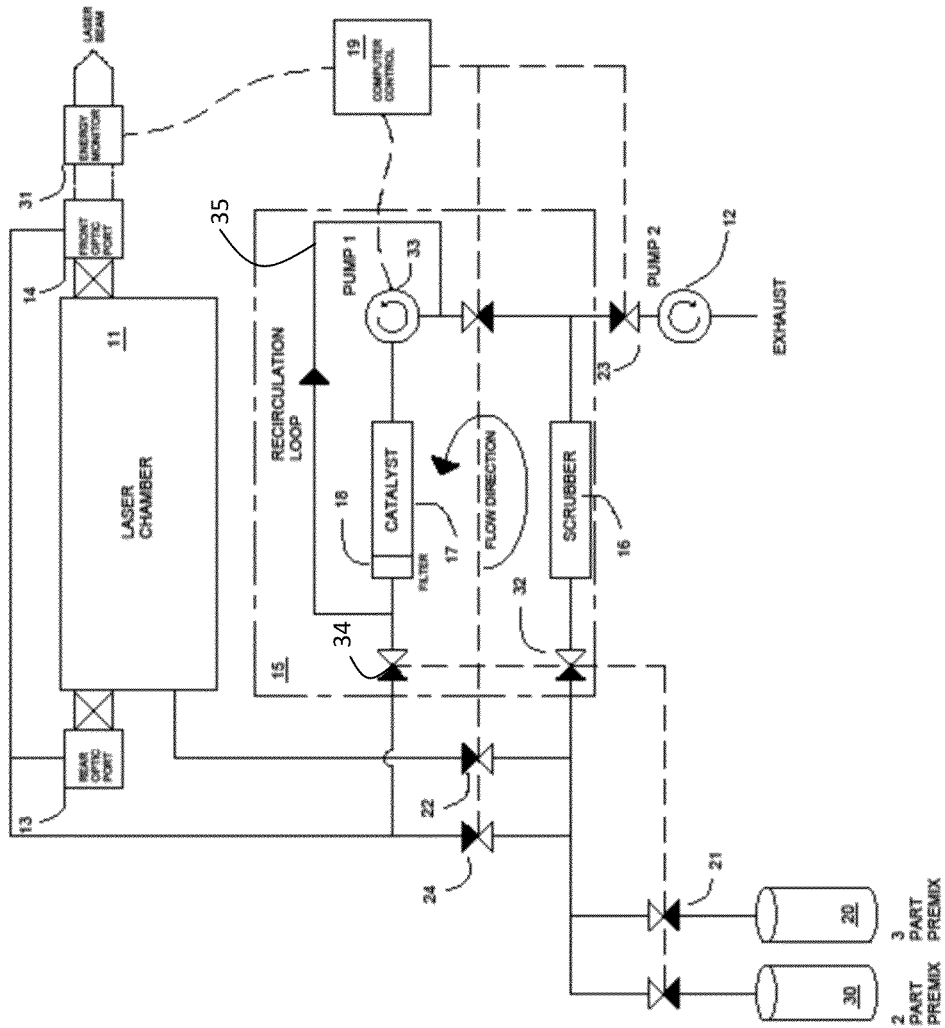
FIG. 6 illustrates another embodiment of an excimer laser in accordance with the present invention.

In an alternative embodiment illustrate in FIG. 6, temporarily closing the output valve 34 and the addition of a recirculation loop 35, including the pump 33, enables the inert contaminants and the noble gases to be recirculated multiple times through the pump 33 and the catalyst 17. The catalyst 17 removes a portion of the contaminants on each pass. Ideally, the flow rate through the purifier 15 and through the recirculation loop 35 is adjusted to ensure that contaminant levels are reduced to <10 ppm prior to returning to the laser chamber 11.

In the alternative embodiment, illustrated in FIG. 6, a second pump 12 is provided for evacuation of the laser chamber 11 or optic ports 13 and 14. Flow rates and function of the two pumps 12 and 33 can be optimized to suit their purpose. The pump 33 is optimized for modest flow rates while operating at laser chamber pressures between 3000 and 5000 mBar. The second pump 12 is optimized for higher flow and vacuum operation, e.g. pumping the laser chamber 11 down to approximately 1 to 10% of its fill pressure at about 1 slpm to about 10 slpm.

As the purification process proceeds, the halogen level of the gas is depleted and the power/energy output of the laser 11 will eventually fall. In response to the lowering laser output power/energy, the stabilization algorithm in the control processor 19 will increase the high voltage level to the electrodes of the laser chamber 11 to maintain the power/energy output of the laser chamber 11 relatively constant. Once the laser power/energy falls below a predetermined set threshold value, detected by the energy monitor 31, or preferably the voltage level supplied to the electrodes rises past a predetermined threshold level, the control processor 19 will shut off the circulation of the laser gases through the purifier 15, e.g. shut valves 32 and 34, and inject fresh halogen-rich premix gas from the bottle 20 into the laser chamber 11 either via valves 21 and 22 into input/output port 12 (see dashed arrows in FIG. 5) or via valves 21 and 24 into optic ports 13 and 14 or via another suitable input port. The injections can continue until the voltage has been reduced to a minimum or a preset threshold level, as determined by the control processor 19 or the output power/energy of the laser 10, as monitored by the energy monitor 31, reaches a predetermined level. Then the purification process can be continued by the opening of valves 32 and 34 again by the control processor 19.

For any given operating parameter of the laser chamber 11, e.g. energy, rep rate, or duty cycle, the speed of the pump 33 in the purification loop determines the equilibrium level of the contaminants in the laser chamber 11. For a higher pump speed the contaminant levels will be lower and the laser high voltage level can be reduced to achieve the same output energy. A lower pump speed will consume less halogen gas, e.g. $F_2$, from the laser chamber 11, but will force the laser to operate at higher voltages and hence increase wear on the laser electrodes. The optimal pump speed will depend on the requirements of the laser user; reduced gas usage or reduced component wear or some combination of the two. By allowing the pump speed to be adjustable the user can control the tradeoff between gas usage and component wear.

Figure 7:
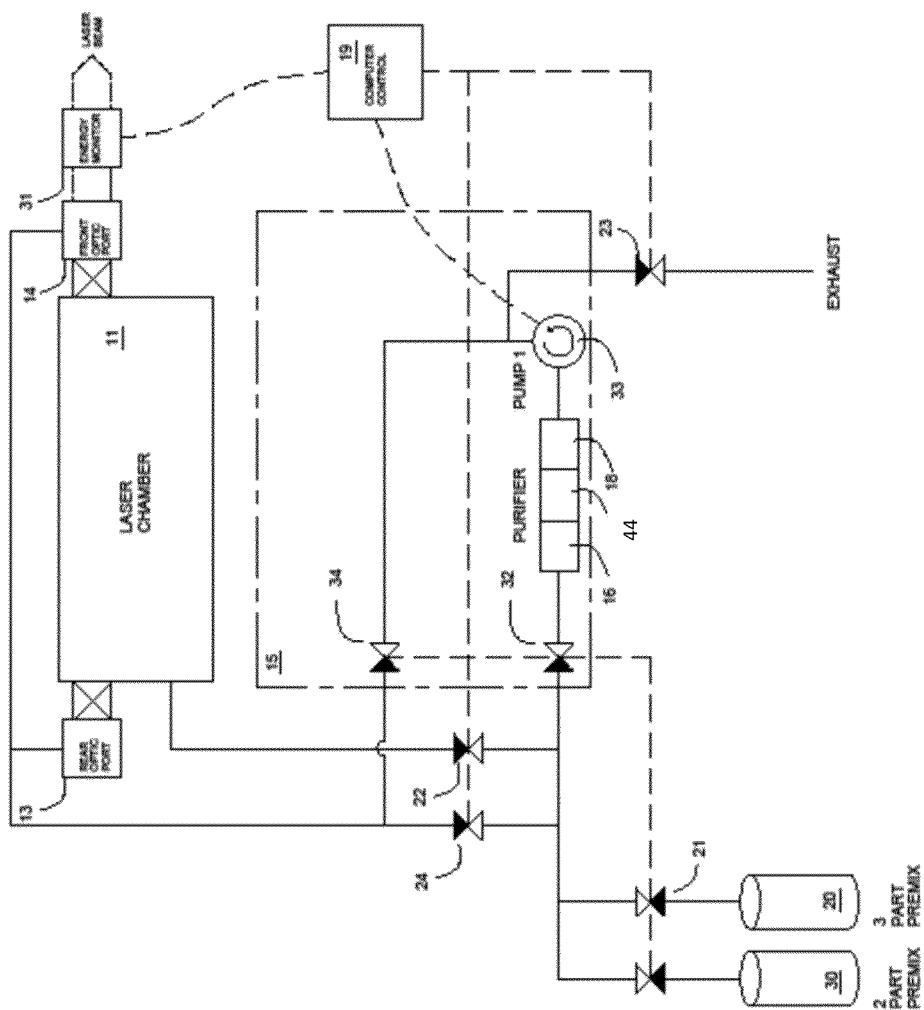
FIG. 7 illustrates another embodiment of an excimer laser in accordance with the present invention.

The simplest implementation of this system is shown in FIG. 7, in which the purifier 15 comprises the scrubber 16, low temperature getter 44 (e.g. 5A molecular sieve) and filter 18 for removal of the reactive gases, including the halogen, and contaminants. The catalyst 17 is not provided in this embodiment.

With respect to the varying the speed of variable speed pump 33, there are at least three implementations:

1) Fixing the speed of the pump 33 in advance by the customer—determined from a predetermined table based upon duty cycle, energy output of the laser 10, and present operating voltage of the laser 10.

2) Fixing the speed of the pump 33 in advance of operation, but having an intermittent duty cycle—where the on/off operation of the purifier 15 is governed by the controller 19, which makes its decision based upon the voltage required to maintain a specific output power of the laser 10.

3) Varying the speed of pump 33 in a continuous operation—where the speed of the pump 33 is governed by the controller 19, which makes its decision based upon the voltage required to maintain a specific output power of the laser 10.

Purifier Regeneration:

During operation of the purifier 15, the molecular sieve material from filter 17, may become saturated with contaminants at a partial pressure deleterious to laser operation. Saturation is an equilibrium condition between trapping and releasing of molecules from the getter and occurs after a predictable period dependant on the flow rate and volume of the molecular sieve. The equilibrium level of the contaminants in the laser gas is too high for efficient laser operation, but the getter could still adsorb more contaminants if the concentration were higher. Probably regeneration of the purifier should be performed before this point, instead when the adsorption rate is too low.

When saturation occurs, the purifier 15, is isolated from the laser chamber 11 by closing the input and output valves 32 and 34. The exhaust valve 23 is opened and the pump 33 is used to evacuate the purifier 15. After a period of time sufficient to allow desorption of collected contaminants from the getter, the exhaust valve 23 closes and the input and output valves 32 and 34 reopened. This procedure can be completed without interruption of laser operation.

In an optimized design, the volume of the purifier 15 can be sized such that the amount of gas removed during regeneration of the getter balances the addition of gas during injections of halogen gas.

Batch Process

Even in production, lasers are seldom operated 24 hours/day, 7 days/week. During normal maintenance, the laser gas mixture can be reconstituted using the gas purification unit 15, FIG. 5. While the laser 10 is off, using the gas circulation pump 33, gases present in the laser chamber 11 are circulated from input/output port 12, via valves 22 and 32, at a faster rate, e.g. about 1 slpm to about 10 slpm, through the gas scrubber 16 to remove reactive gases present including the halogen gas required for operation of the laser chamber 11. Gas purification proceeds in the manner detailed above.

The process is continued until the partial pressures of the impurities are reduced, e.g. from 100-500 ppm of $CF_4$ to the 1 to 100 ppb level. This is a timed process and requires no monitoring of the gas purity. The process can be completed in as little as 20 minutes, but could be longer allowing a smaller purifier to be used. Ideally, the contaminated gases in the laser chamber 11 are passed through the gas purification unit 15 multiple times, e.g. at least 10 times, preferably at least 15 times, reducing the contaminant concentration in the chamber on each pass.

Once the process is complete, no halogen gas or impurities are present in the gas. Any excess pressure present in the laser chamber 11 is removed and halogen gas is then injected to the correct concentration from the bottle 20 either via the valves 21 and 22 into input/output port 12 or via valves 21 and 24 into optic ports 13 and 14 or via another suitable input port. If the concentration of halogen is too low in the premix bottle 20 more total premix needs to be added to put the same number of halogen molecules into the laser chamber 11, which results in a pressure increase that must be corrected by dumping a portion of the gases from the laser chamber 11, e.g. using exhaust valve 23. Any small corrections in halogen concentration are made when the laser chamber 11 begins running by the control processor 19, which minimizes the energy input to maintain a given energy output. By mixing the correct partial pressures in the bottle 20 of the rare and buffer gases in the halogen gas mixture the correct partial pressure of rare gas in the laser chamber 11 is maintained without requiring rare, buffer or halogen gas monitors along with complicated control processors for monitoring the gas mixture.

The competing demands of lower halogen concentration during initial filling and higher halogen concentration during replenishing injections result in an optimum range for the single premix halogen concentration to minimize gas usage. This optimum is determined by the halogen lost during the filling process and the amount of halogen consumed and hence replaced with premix before the impurities in the gas mixture prevent the laser chamber 11 from achieving the desired laser output.

In an example laser a target gas mixture of 2% mole noble lasing gas, 0.1% mole halogen gas, and a noble buffer gas (97.9% mole) can be created with a three part mixture containing 5% (or anywhere between 0.5% to 10%) halogen gas and the lasing gas to buffer gas ratio the same as the target gas mixture. The laser chamber 11 is filled with the halogen-rich mixture, and then the mixture is cycled through the purifier 15 to remove the halogen. The needed halogen is made up by adding enough premix from bottle 20 to raise the halogen concentration from 0% to approximately 0.1%.

We claim:

1. An excimer laser system comprising:
    a laser chamber containing a laser gas mixture of a noble gas, a buffer gas and a halogen gas at operating concentrations for operating the laser, the laser chamber including a gas input port and a gas output port;
    a scrubber coupled to the gas output port for removal of the halogen gas;
    a gas purifier coupled between the scrubber and the gas input port for removing impurities from the noble and buffer gases;
    a pump for circulating the laser gas mixture out of the gas output port, and the noble and buffer gases back in the input port after purification;
    a gas supply bottle coupled to the laser chamber containing a halogen-rich laser gas mixture including the noble lasing gas and buffer gas at a ratio the same as the operating concentrations, and the halogen gas at above the operating concentration; and
    a controller for isolating the gas purifier from the laser chamber, for coupling the gas supply bottle directly to the laser chamber, and for supplying the halogen-rich laser gas mixture to replenish the halogen gas without affecting the relative concentration of noble and buffer gases;
    wherein the purifier includes a recirculation loop for passing the noble and buffer gases through the purifier a plurality of times before returning them to the laser chamber.

2. The system according to claim 1, wherein the gas supply bottle contains halogen gas at a concentration between 5 and 100 times higher than the operating concentration to reduce noble gas usage when replacing depleted halogen.

3. The system according to claim 1, wherein the controller monitors operating conditions of the laser during operation of the laser; wherein the controller injects halogen-rich gas mixture based on operating conditions of the laser.

4. The system according to claim 3, further comprising a power monitor for measuring output power of the laser chamber; wherein the controller increases input electrical voltage to the laser as the output power of the laser decreases; and wherein the controller injects halogen-rich gas mixture when the input electrical voltage increases above a predetermined threshold level.

5. The system according to claim 1, wherein the pump comprises a variable speed pump for varying the flow rate of the laser gas mixture through the scrubber and gas purifier to adjust the amount of halogen and impurities removed over time.

6. The system according to claim 1, wherein the noble lasing gas and the halogen gas comprise one of: Ar:F, Kr:F, Xe:F, respectively.

7. The system according to claim 1, wherein the noble lasing gas and the halogen gas comprise one of: Ar:Cl, Kr:Cl, Xe:Cl, respectively.

8. The system according to claim 1, wherein the purifier includes a catalyst to remove impurities present in the laser gas mixture, and wherein the catalyst is heatable to a temperature between 400 and 700° C.

9. The system according to claim 1, wherein the purifier includes a catalyst to remove impurities present in the laser gas mixture, and wherein the catalyst is reactable at room temperature.

10. The system according to claim 1, wherein only the pump is used to control the flow of the laser gas mixture through the purifier, evacuation of the laser chamber, and evacuation of the input port and the output port.

11. A method of operating an excimer laser comprising:
a) providing a laser chamber containing a laser gas mixture comprising a noble gas, a buffer gas and a halogen gas at operating concentrations, the laser chamber;
b) providing a gas supply bottle containing a halogen-rich laser gas mixture comprising the noble and buffer lasing gases at a ratio of approximately the same as in the operating concentration, and the halogen gas at above the operating concentration;
c) passing the laser gas mixture through a scrubber to remove the halogen gas, and through a purifier to remove impurities from the noble and buffer gases;
d) isolating the scrubber and purifier from the laser chamber for coupling the gas supply bottle directly to the laser chamber, and
e) supplying the noble and buffer gases only from the supply bottle at the ratio approximately the same as in the operating concentrations, and the halogen gas at above the operating concentration to replenish the halogen gas without affecting the concentration of noble and buffer gases;
wherein the method further comprises passing the noble and buffer gases through the purifier a plurality of times in a recirculation loop before returning them to the laser chamber.

12. The method according to claim 11, wherein the gas supply bottle contains halogen gas at a concentration between 5 and 100 times higher than the operating concentration to reduce noble gas usage when replacing depleted halogen.

13. The method according to claim 11, further comprising monitoring operating conditions of the laser using a controller during operation; wherein the controller injects halogen-rich gas mixture from the gas supply bottle based on the operating conditions of the laser.

14. The system according to claim 13, wherein monitoring operating conditions of the laser comprises measuring output power of the laser; wherein the controller increases input electrical voltage to the laser as the output power of the laser decreases to maintain the output power relatively constant; and wherein the controller injects halogen-rich gas mixture when the input electrical voltage increases above a predetermined threshold level.

15. The method according to claim 11, further comprising varying the flow rate of the laser gas mixture through the purifier.

16. The method according to claim 11, wherein step c) is conducted continuously when the excimer laser is in operation.

17. A method of operating an excimer laser comprising:
a) providing a laser chamber containing a laser gas mixture comprising a noble gas, a buffer gas and a halogen gas at operating concentrations, the laser chamber;
b) providing a gas supply bottle containing a halogen-rich laser gas mixture comprising the noble and buffer lasing gases at a ratio of approximately the same as in the operating concentration, and the halogen gas at above the operating concentration;
c) passing the laser gas mixture through a scrubber to remove the halogen gas, and through a purifier to remove impurities from the noble and buffer gases;
d) isolating the scrubber and purifier from the laser chamber for coupling the gas supply bottle directly to the laser chamber, and
e) supplying the noble and buffer gases only from the supply bottle at the ratio approximately the same as in the operating concentrations, and the halogen gas at above the operating concentration to replenish the halogen gas without affecting the concentration of noble and buffer gases;
wherein the method further comprises filling the laser before operation with the halogen-rich laser gas mixture from the gas supply bottle; passing the halogen-rich laser gas mixture through the purifier thereby removing the halogen and any impurities; and injecting halogen-rich laser gas mixture directly into the laser chamber from the gas supply bottle to provide the operating concentration of halogen.

18. The method according to claim 17, wherein halogen-rich laser gas mixture is circulated through the purifier multiple times, removing a portion of the contaminants in each pass prior to returning the laser chamber.

* * * * *